United States Patent [19]

Pankow

[11] Patent Number: 4,872,965
[45] Date of Patent: Oct. 10, 1989

[54] CONTACT LENS CLEANING APPARATUS

[76] Inventor: Mark L. Pankow, 2106 N. Seminary, Chicago, Ill. 60614

[21] Appl. No.: 154,790

[22] Filed: Feb. 10, 1988

[51] Int. Cl.[4] ........................ B08B 3/12; B08B 6/00; B08B 7/00
[52] U.S. Cl. .................................. 204/299 R; 134/1
[58] Field of Search .................... 134/1; 204/299 R

[56] References Cited

U.S. PATENT DOCUMENTS

| | | | |
|---|---|---|---|
| Re. 32,672 | 5/1988 | Huth | 252/95 |
| 3,871,395 | 3/1975 | Murry | 134/107 |
| 3,908,680 | 9/1975 | Krezanoski | 134/27 |
| 3,962,069 | 6/1976 | Inoue | 204/300 R |
| 4,096,870 | 6/1978 | Manfuso, Jr. | 134/28 |
| 4,187,574 | 2/1980 | Wrue | 15/104.92 |
| 4,223,782 | 9/1980 | Giambalvo | 206/5.1 |
| 4,263,054 | 4/1981 | Giambalvo | 134/21 |
| 4,357,173 | 11/1981 | Rosenthal | 134/6 |
| 4,444,307 | 4/1984 | Jermyn | 206/5.1 |
| 4,559,662 | 12/1985 | Kunold, Jr. | 15/104.94 |
| 4,582,076 | 4/1986 | Prat | 134/57 R |
| 4,607,652 | 8/1988 | Yung | 138/184 |
| 4,608,147 | 8/1988 | Clad | 204/301 |
| 4,609,493 | 9/1986 | Schafer | 252/546 |
| 4,615,786 | 10/1986 | Culkin | 204/301 |
| 4,619,747 | 10/1986 | Hoadley | 204/182.3 |
| 4,631,120 | 12/1986 | Pohl | 204/182.8 |
| 4,732,185 | 3/1988 | Cowle | 134/84 |

OTHER PUBLICATIONS

Eriksen S., Cleaning Hydrophilic Contact Lenses: An Overview, *Annals of Opthalmology,* Sep. 75, 1223–32.
McClure, et al., The Effect of Measured Visual Acuity of Protein Deposition and Removal in Soft Contact Lenses, *Contacto,* Mar. 77, 8–12.
Bilbaut, T., et al., Deposits on Soft Contact Lenses., Electrophoresis and Scanning Electron Microscopic Examinations Exp. Eye Res., Aug. 86, 153–65.
Gachon, A. M., et al., Protein Migration Through Hydrogels: *Analytical Biochem.,* Sep. 86, 249–55.
(Optometry Documenta), Identification, Prevention and Removal of Contact Lens Deposits, (1984).

*Primary Examiner*—John F. Niebling
*Assistant Examiner*—Isabelle Rodriguez

[57] ABSTRACT

An apparatus for cleaning soft contact lenses by the application of an electrical field and comprising a base which is made of non-conducting material for holding a lens, a fluid capable of transmitting the electrical charge, means for containing the electrical charge transmitting fluid, means for providing a DC charge, means for creating separate electrical poles, and means composed of a substance which when immersed with the electrical charge transmitting fluid is capable of transmitting the electrical charge to at least one lens for the purpose of cleaning the lens.

17 Claims, 1 Drawing Sheet

U.S. Patent
Oct. 10, 1989
4,872,965
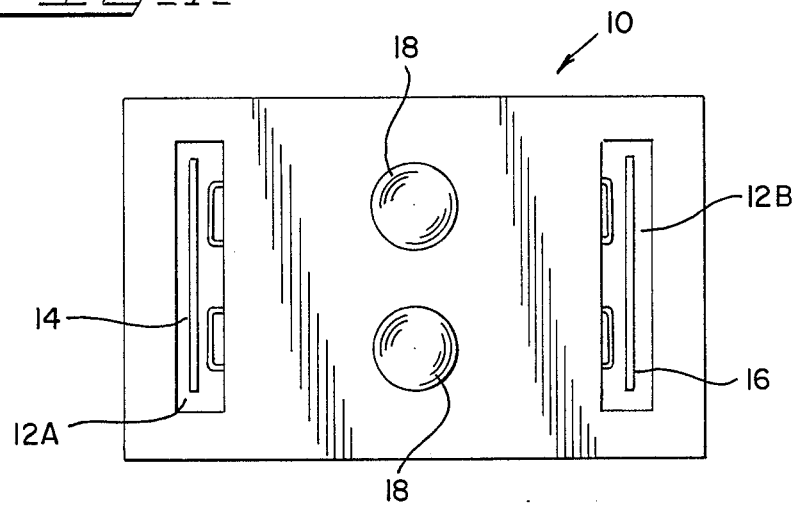
FIG-1-
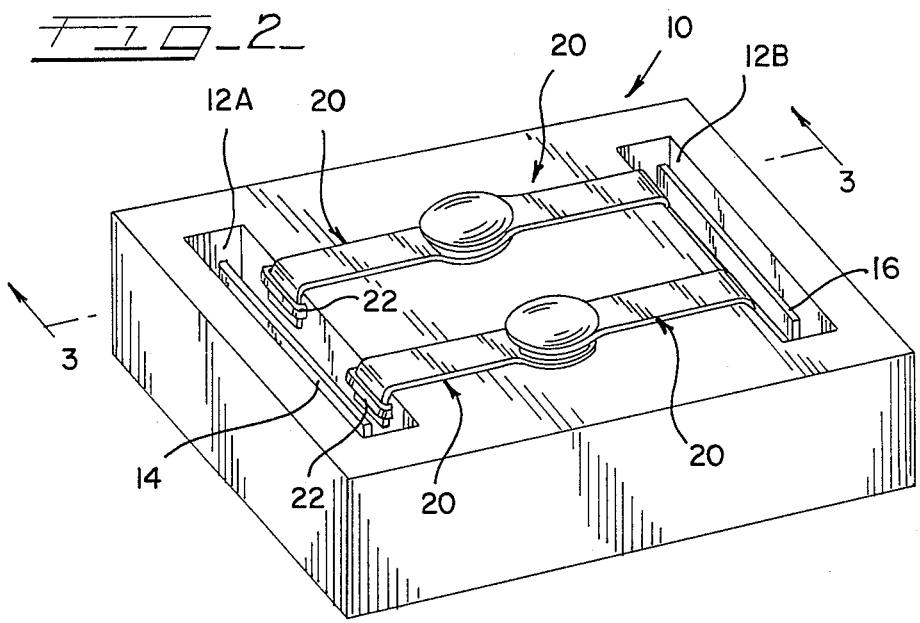
FIG-2-
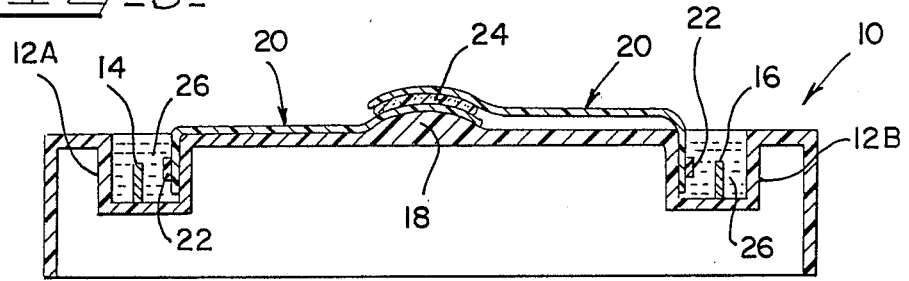
FIG-3-

CONTACT LENS CLEANING APPARATUS

BACKGROUND OF THE INVENTION

This invention relates to an apparatus for cleaning soft hydrophilic gel contact lenses, commonly termed soft contact lenses. More particularly, the invention relates to an apparatus for cleaning soft contact lenses by the application of an electrical field through a moistened medium that is in contact with one or more soft contact lenses. The invention removes the accumulated lens contaminants by the electrically-induced migration of the contaminants from the surface and out of the body of the lens.

Soft contact lenses are porous films which may be made of a variety of materials and which are used, generally, to correct for defects in vision. Foreign substances, however, may accumulate on the surface of the lenses or may be absorbed within the body of the lenses. Contamination is a problem which confronts all wearers of soft contact lenses. The contaminants come from a variety of sources. For example, the atmosphere contains a variety of organic and inorganic substances which may act to contaminate soft lenses. Handling of the lenses places microscopic deposits on the surface of the lenses. The tears which constantly bathe the lenses contain a variety of organic and inorganic molecules which can be selectively absorbed from the tears onto and within the soft lenses.

Lens accumulations may provide a suitable substrate for other compounds such as preservatives or organisms (e.g., bacteria, fungi, and yeasts) which, but for the accumulations, may not have become associated with the lens.

Lens deposits can adversely affect the optical performance of the lens. It is known that the rate of contaminate deposition is, in part, a function of the actual wearing time of the lenses. After some period, deposits may appear as a white, partially opaque layer or as a clear, transparent layer, with or without color, which covers all or part of the lens. With increased lens opacity, visual acuity is decreased. Lens deposits will also alter the optical characteristics of the lenses.

Besides affecting the optical performance of the lens, the contamination of a soft contact lens can also affect the physiology of the eye. Increased irritation, "red eye", and conditions such as allergic conjunctivitis or giant papillary conjunctivitis may also be produced by a contaminated lens.

To maintain the physical and optical characteristics and performance of their lenses, users normally must remove the deposits and then sterilize the lenses to kill bacteria and other microorganisms which reside on the surface of and within the lenses. This regime must be followed on a regular, often daily basis.

Conventional cleaning apparatus utilize a variety of physical and chemical techniques. Physical cleaning techniques include scrubbing methods, agitation methods, and swirling methods. Chemical techniques consist of the use of surfactant cleaners, oxidizing agents, and enzyme cleaners, among others.

A variety of patents teach specific physical or chemical solutions to the problem of removing unwanted lens deposits. As to removal of the contaminants by physical methods, the following rely entirely or partially on such methods: U.S. Pat. No. 4,607,652 (application of ultrasonic frequency mechanical vibrations); U.S. Pat. No. 4,582,076 (rotation of lens to enhance cleansing action); U.S. Pat. No. 4,559,662 (scrubbing apparatus); U.S. Pat. No. 4,444,307 (agitation and swirling apparatus in part performed by impellers); U.S. Pat. No. 4,187,574 (scrubbing means); and U.S. Pat. No. 3,871,395 (use of high ultrasonic frequency).

As to chemical methods to remove lens contaminants, the following rely in whole or in part on such methods: U.S. Pat. No. 4,609,493 (contact lens cleaning preparation comprising, in part, of an enzyme with proteolyic activity, a surfactant, and anionic dissociating compounds); U.S. Pat. No. 4,096,870 (cleaning by pancreatin); and, U.S. Pat. No. 3,908,680 (use of an acidic solution and basic solution).

Conventional cleaning apparatus which utilize these techniques, however, may be ineffective or may harm the lenses. For example, physical cleaning techniques may abrade the surface of the lens and thereby impair the optical performance of the lens. Chemical cleaners, such as surfactants, may be ineffective because they may not remove all contaminants or be undesirable because a chemical deposit may remain on the lens at the completion of the cleaning. Strong oxidizing agents, such as persulfates, perborates, or even hypochlorite bleaching agents may remove films but often with irreversible damage to the lens. Enzyme cleaners and calcium-chelating solutions may remove certain components of the film but must be used regularly.

SUMMARY OF THE INVENTION

An object of the present invention is to provide an easy and effective way to clean soft contact lenses by avoiding resort to traditional physical or chemical techniques which may damage the lenses.

To accomplish this objective, a novel apparatus is provided. The apparatus is simply constructed and cleans conveniently and without harm to the soft lens by the application of an electric field. The apparatus consists of a base made from nonconducting material for holding a lens, a fluid capable of transmitting the electrical charge, means for containing the electrical charge transmitting fluid, means for providing a DC charge, means for creating separate electrical poles, and means composed of a substance which, when immersed with the electrical charge transmitting fluid, is capable of transmitting the electrical charge to at least one lens for its cleaning.

BRIEF DESCRIPTION OF THE DRAWINGS

FIG. 1 is a view of the contact lens cleaning apparatus without the transmission means in place;

FIG. 2 is a perspective view of the contact lens cleaning apparatus; and

FIG. 3 is a cross-sectional view taken along lines 3—3 of FIG. 2 showing an internal view of the contact lens cleaning apparatus.

DESCRIPTION OF THE PREFERRED EMBODIMENT

Referring now to FIG. 1, FIG. 2, and FIG. 3 there is shown a soft contact lens cleaning apparatus 10 made of a housing constructed from a non-electrically conducting substance such as a plastic polymer.

The apparatus 10 provides a means for containing a fluid such as fluid containing means 12A and 12B. Exposed in one of the fluid containing means 12A is a first means for creating an electrical charge such as electrode 14, which when the apparatus 10 is operating will continuously act either as a negative or as a positive charge. Provided in another fluid containing means 12B is a second means for creating an electrical charge, such as electrode 16, which when apparatus 10 is operating will create that charge which is opposite of the charge created by the electrode 14.

Projecting from apparatus 10 are one or more concave shapes 18. Onto these shapes 18 a transmission means 20 composed of a substance, not inimical to a soft contact lens and which is capable of transmitting an electrical charge (not shown) when wetted, is placed. Said transmission means 20 is intended to accept a charge from either, but not both of said electrode 14 or said electrode 16 when the apparatus is in operation. The transmissions means 20 extends to either fluid containing means 12A or 12B and may be held in place by a fastening means 22. On the top of, and in contact with the transmission means 20, a soft contact lens 24 is placed. Above and in contact with the lens 24, an additional transmission means 20 is placed which extends to the other fluid containing means 12. The transmission mean is held in 12B by a fastening means 22.

The cleaning of a contact lens 24 is carried out in accordance with the following steps. First, one end of a transmission means 20 is secured in a fluid containing means 12A by a fastening means 22. The other end is placed over and in conformity with one of the concave shapes 18. Saline or ionic disinfecting solution fluid 26, such as Bausch & Lomb cold sterile disinfecting solution, is placed into the fluid containing means 12A in an amount sufficient to cover either of the electrodes, electrode 14 or electrode 16, which are present therein and to accommodate the absorption of the fluid 26 by the transmission means 20. However, the fluid containing means 12A cannot be over-filled and the fluid 26 contained in fluid containing means 12A and 12B cannot be allowed to communicate. Such communication would negate the separate charge which each fluid 26 and each transmission means 20 is carrying when in operation. Onto that portion of the wetted transmission means 20, which is in conformity with one of the concave shapes 18, a lens 24 is placed.

Another transmission means 20 is secured in another fluid containing means 12B by a fastening means 22. The other end is placed over the contact lens 24 which is in place and in conformity with the concave shapes 18 covered by the transmission means 20. Fluid 26 is placed into the fluid containing means 12B in an amount to cover either electrode 14 or electrode 16 exposed therein and to accommodate the absorption of the solution by the transmission means 20 but not in an amount which would allow charge-negating communication between the fluid containing means 12A and 12B.

The power to operate the apparatus 10 is provided by a power pack, Model No. E-C 103 manufactured by E-C Apparatus Corp. of St. Petersburg, Fla., which supplies a direct current of 120 volts. The power pack is adapted to supply power through a normal electric lead and connected to a normal source of 110 volt, 60 cycle, A.C. current supply, or a separate electric source such as normal batteries or rechargeable batteries. It has been found that when the apparatus is in operation the direct current begins at approximately 3 milliamps. After the complete running time of fifteen to twenty minutes, the current may increase to approximately 4.5 to 5 milliamps.

The apparatus cleans soft contact lenses through the unique application of electrokinetic phenomenon. Soft contact lenses are made from hydrophilic molecules which absorb large proportions of the water within the lattice they create. The material is often considered to be a gel, which is basically a molecular lattice existing within an aqueous environment. Most substances acquire a surface electric charge when brought into contact with an aqueous medium. The contaminants of a soft contact lens are no different. They are electrically charged as a result of their contact with the aqueous medium of the lens. It is known that a charged material, which is in contact with a liquid, will move relatively to the stationary liquid under the influence of an applied electric field. It has been discovered that the contaminants absorbed on or trapped within hydrogel contact lenses will migrate from a soft lens when an electric field is applied. The present invention is a new apparatus which relies on this electrokinetic phenomenon to remove contaminants from a soft lens.

A lens or lenses may be cleaned through the operation of the apparatus 10 in approximately fifteen minutes at room temperature. Cleaning time, however, will vary with the extent to which the lens is contaminated and the thickness of the lens. Since the current flowing through the lens or lenses to be cleaned, as measured in milliamps level, increases as the lens becomes cleaner and therefore electrical resistance decreases, the apparatus 10 may be fitted with a means to stop the power flow and therefore the cleaning process once a certain amperage level is attained. Alternatively, the power flow to the apparatus 10 may simply stop after the apparatus has been allowed to run a certain period of time and as measured by a separate timing mechanism (not shown). Further alternatively, the apparatus could simply stop at any point desired by the operator.

When in operation, deposits (not shown) or contaminants (not shown) will migrate from the surface of the contact lens 24 or from within the body of the contact lens 24 and onto the surface of said contact lens 24 or onto the transmission means 20. The deposits or contaminants may be removed from the surface of the contact lens 24 such as by washing the surface of the contact lens 24. Where deposits or contaminants migrate on to the surface of the transmission means 20, they may be washed from the transmission means 20. The transmission means 20 may also be discarded.

As will be understood by those skilled in the art, various arrangements other than those described in detail in the specification will occur to those person skilled in the art which arrangements are within the spirit and scope of the invention. It is, therefore, to be understood that the invention is to be limited only by the claims appended hereto.

What is claimed is:

1. A lens cleaning apparatus comprising:
   means for containing a fluid capable of transmitting an electrical charge;
   means for supplying an electrical current to said fluid;
   means for transmitting said electrical current from said fluid to a location remote from said fluid, said electrical transmitting means including an immersion end within said electrical charge transmitting fluid, said electrical transmitting means further being for transmitting the electrical current from said fluid to said remote location; and
   at least said fluid containing means, said electrical current supplying means, and electrical current solely transmitting means cooperate to clean a lens positioned at said remote and exterior location.

2. The lens cleaning apparatus according to claim 1, further including a support means at said remote location.

3. The lens cleaning apparatus according to claim 2, wherein said support means includes a concave surface.

4. The lens cleaning apparatus according to claim 1, wherein said means for supplying said electrical current further includes means for varying the magnitude of said current.

5. The lens cleaning apparatus according to claim 1, further including means for monitoring the amperage of the current flowing through said electrical current transmitting means, said amperage monitoring means being for determining and indicating when a predetermined amperage has been reached, thereby indicating that a desired level of lens cleaning has been attained.

6. The lens cleaning apparatus according to claim 1, wherein said means for supplying said electrical current further includes timing means for controlling the amount of time the current is supplied.

7. The lens cleaning apparatus according to claim 1, wherein said electrical current transmitting means includes a contact area, said contact area being for contacting the surface of said lens.

8. The lens cleaning apparatus according to claim 1, further including means for holding said electrical current transmitting means.

9. The lens cleaning apparatus according to claim 1, wherein said fluid containing means is in contact with a base.

10. A lens cleaning apparatus comprising:
containers for holding a fluid capable of transmitting an electrical charge;
electrodes positioned singly within said containers and connected to a D.C. power supply;
transmitters, including an immersion end within said electrical charge transmitting fluid, by which an electrical current will be transmitted from said fluid to a location remote from said fluid;
support for a lens at said remote location to which said transmitters extend from said fluid held within said fluid containers.

11. The lens cleaning apparatus according to claim 10, further including a control for varying the magnitude of said current.

12. The lens cleaning apparatus according to claim 11, further including an amperage monitor which measures the current flowing through said electrical current transmitting means, said amperage monitor being for determining and indicating when a predetermined amperage level has been reached, thereby indicating that a desired level of lens cleaning has been attained.

13. The lens cleaning apparatus according to claim 12, further including a timer to control the length of time the current is supplied.

14. The lens cleaning apparatus according to claim 13, wherein said support includes a concave surface.

15. The lens cleaning apparatus according to claim 14, wherein said electrical current transmitters include a contact area which contacts the surface of said lens.

16. The lens cleaning apparatus according to claim 15, wherein said containers contact a common base.

17. A method for cleaning a lens which method comprises:
filling containers with a fluid capable of transmitting an electrical charge;
imparting an electrical current to said fluid;
transmitting said electrical current solely from said fluid to a location remote and exterior from said fluid; and
positioning a lens at said remote location for receiving said current therethrough.

* * * * *